United States Patent [19]

Mouille

[11] 4,014,484
[45] Mar. 29, 1977

[54] VIBRATION ATTENUATING SUSPENSION SYSTEM FOR ROTARY-WING AIRCRAFT ROTORS

[75] Inventor: René Louis Mouille, Aix-en-Provence (Bouches du Rhone), France

[73] Assignee: Societe Nationale Industrielle Aerospatiale, Paris (Seine), France

[22] Filed: Apr. 25, 1975

[21] Appl. No.: 571,863

[30] Foreign Application Priority Data

May 9, 1974  France ............................ 74.16012

[52] U.S. Cl. ............................ 244/17.27; 188/1 B; 248/358 R
[51] Int. Cl.² ........................................ B64C 27/00
[58] Field of Search ......... 244/17.27, 17.25, 17.11; 188/1 B; 416/500; 248/15, 18, 20, 358 R

[56] References Cited

UNITED STATES PATENTS

| | | | |
|---|---|---|---|
| 2,615,657 | 10/1952 | Young et al. | 244/17.27 |
| 3,078,969 | 2/1963 | Campbell et al. | 188/1 B X |
| 3,118,504 | 1/1964 | Cresap | 244/17.27 X |
| 3,276,762 | 10/1966 | Thomas | 188/1 B X |
| 3,502,290 | 3/1970 | Legrand et al. | 244/17.27 X |
| 3,858,831 | 1/1975 | Halwes | 244/17.27 |

*Primary Examiner*—Trygve M. Blix
*Assistant Examiner*—Barry L. Kelmachter

[57] ABSTRACT

A suspension system is disclosed for reducing vibration between the rotor and the structure of a rotary-wing aircraft having a reduction-gear train coextensive with the shaft of the lift rotor. The housing of said gear train is supported by tie-rods and by a flexible beam having its mid-point attached to said housing and its extremities attached to the aircraft structure through the medium of flexible blocks. The beam may be made of metal or a composite material.

12 Claims, 5 Drawing Figures

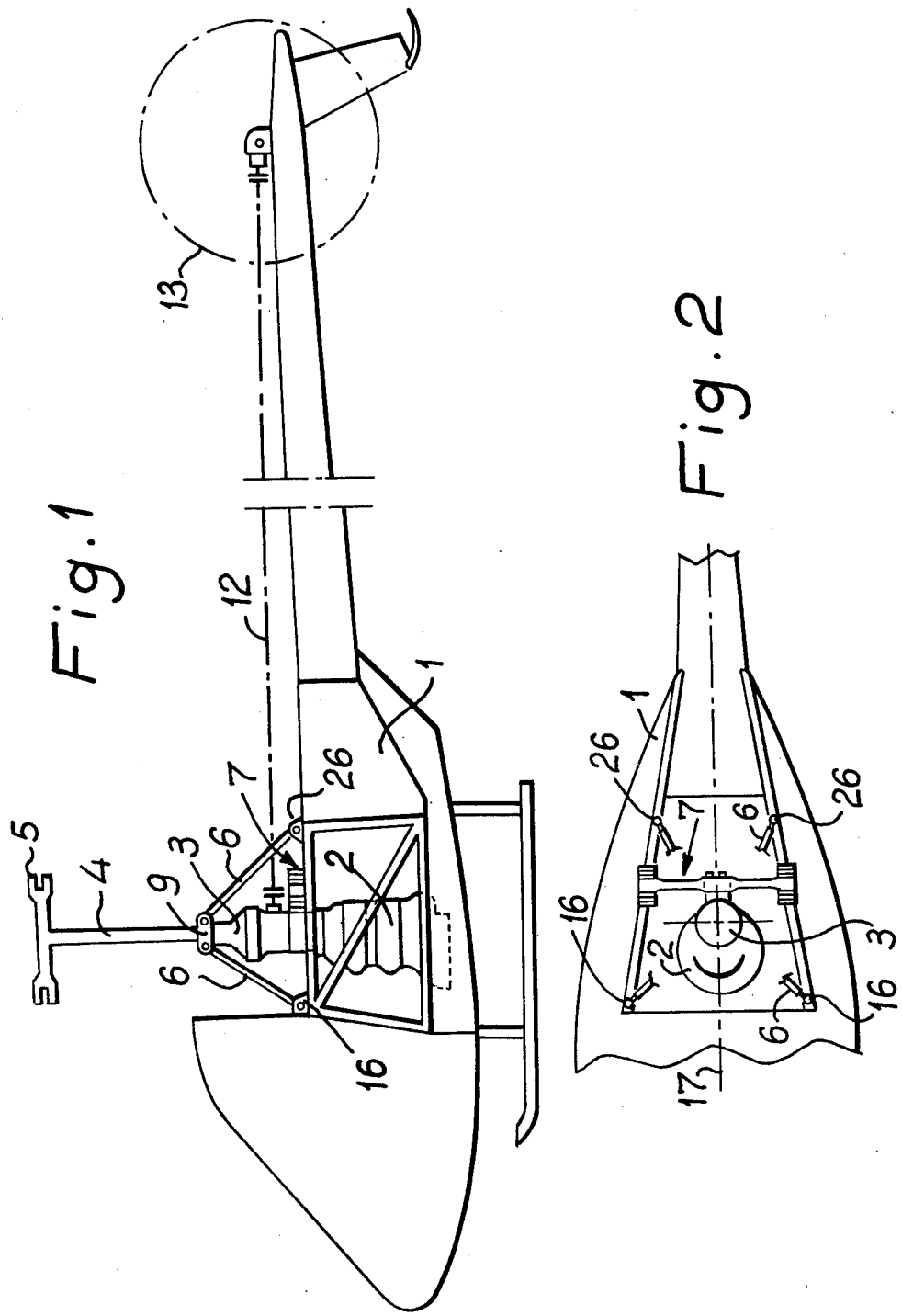

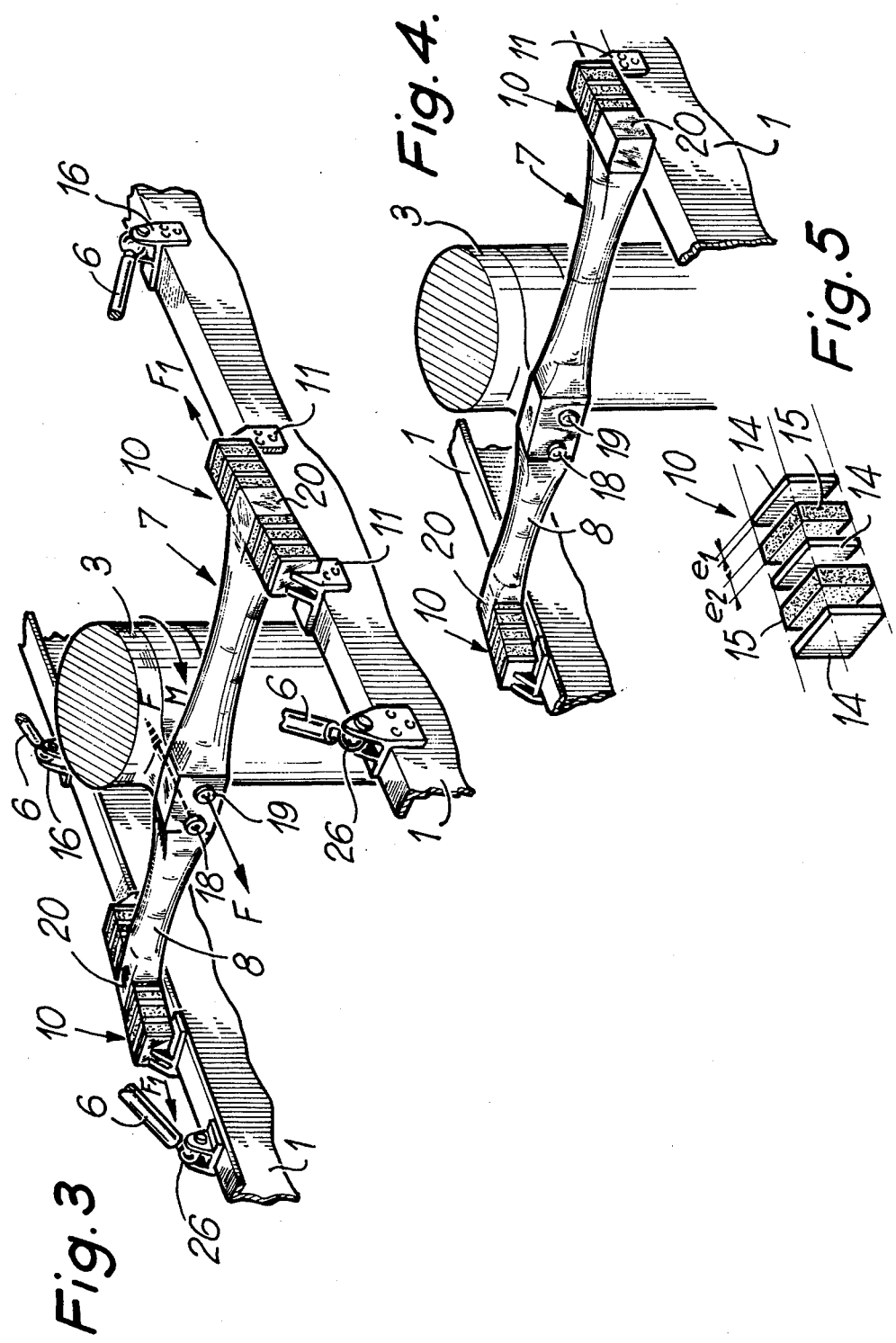

VIBRATION ATTENUATING SUSPENSION SYSTEM FOR ROTARY-WING AIRCRAFT ROTORS

This invention relates to a suspension system for rotary-wing aircraft rotors, and notably applicable to helicopters, that enables various static and dynamic forces to be transmitted to the aircraft structure and attenuates or filters out certain vibrations between the lift rotor and said structure.

Attenuation of the vibration induced in the structure of a rotary-wing aircraft by its spinning rotor has invariably been difficult to overcome. Already known in the prior art are a variety of arrangements adapted to both support the rotor and its drive components and attenuate the harmful effects of the vibration engendered by the rotor in flight. Thus the Applicant's French Pat. No. 1,507,306 describes an arrangement consisting basically of a flat plate of special shape attached to the fuselage and to the end face of the housing of the main gearbox driving the rotor on a helicopter. This plate is formed with voids in it that endow it with a degree of flexibility in a particular direction and thus allow transmitting through its plane various static or dynamic loads particularly the torque reaction and filtering or attenuating, depending on the number and positions of the voids, the unwanted vibration mentioned precedingly. When used in conjunction with an arrangement of rods interconnecting the fuselage and the main gearbox, such a system provides an advantageous way of overcoming the problems of load transmission to the structure and of thereby attenuating vibration, in cases where it is required to leave the space above the main gearbox free, as when the power-plant is on the same level as the gearbox.

Further, the Applicant's French Pat. No. 73/16,475 describes an arrangement which by virtue of its simplicity of construction makes it possible to overcome the problem of vibration on rotary-wing aircraft even more economically, in particular when it is required to attenuate or filter out heavy vibration in two mutually perpendicular directions while at the same time retaining a free space above the main gearbox.

Location of the engine on the same level as the gearbox is an advantage when it is required to have a helicopter that provides a maximum of useful space near the centre of gravity of the machine, that is to say substantially along the rotor axis.

Conversely, it is preferable to position the engine beneath the main gearbox when it is required to concentrate as many as possible of the components essential to operation of the aircraft. Such an arrangement makes it possible to reduce the size and the empty weight of the aircraft and is especially advantageous in the case of a light helicopter.

The present invention has for its object to provide a solution to the problem of vibration on a rotary-wing aircraft the engine of which is in the latter-mentioned location and forms with the gearbox a reduction-gear train in alignment with the lift rotor drive shaft.

Accordingly, the invention provides a very compact suspension system which enables the reduction-gear train of a rotary-wing aircraft to be maintained in position. Such system supports the reduction-gear drive train in conjunction with a set of tie-rods and performs at once the vibration damping to ensure comfort and extended life of the aircraft and the transmission of forces to the aircraft structure, particularly the torque reaction forces.

A system according to this invention includes a resilient beam connecting the drive train to the aircraft structure, to which its ends are attached through the medium of flexible blocks, and said beam has its middle secured to the housing of the drive train. It extends transversely to the direction of the rotor shaft and its points of attachment to the structure of the rotary-wing aircraft preferably lie on either side of the structure, between the attachment points for the tie-rods extending between the upper part of the drive-train housing and said structure.

Preferably, said beam has a cross-section the area and possibly the shape of which vary along its length, between its middle and either of its ends, in such manner as to endow it with flexibility to match the operating conditions and to enable it, in conjunction with the flexible blocks positioned at its ends, to attenuate the principal vibration modes encountered during operation of the aircraft. Thus the cross-sectional area of the beam may go decreasing away from the middle of the beam and on either side thereof, the shape of said cross-section being preferably rectangular or square in the middle and at the ends of the beam and gradually evolving between these attachment places towards a shape of a circle of progressively changing diameter.

The flexible end blocks, the positions of which are selected according to the predominant vibration modes, are preferably of laminate structure consisting of stacked alternately flexible and rigid slabs.

The description which follows with reference to the accompanying non-limitative exemplary drawings will give a clear understanding of how the invention can be carried into practice.

In the drawings:

FIG. 1 shows in side elevation the silhouette of a helicopter having a vertically disposed drive/reduction-gear train and equipped with a system according to this invention;

FIG. 2 is a fragmental plan view of the helicopter of FIG. 1;

FIG. 3 is a rear perspective view of the system according to the invention;

FIG. 4 depicts an alternative method of attaching the system to a helicopter structure; and FIG. 5 is an exploded view of an exemplary embodiment of a flexible attachment block for the subject system of this invention.

FIG. 1 shows diagrammatically in side elevation a helicopter fuselage structure 1 supporting, through the agency of an arrangement of tie-rods 6 and a subject system of the invention 7, a drive/reduction-gear train consisting primarily of a gearbox 3 aligned vertically with an engine 2 and above which extends a shaft 4 terminating in a hub 5 to which the rotor blades (not shown) are attached.

Extending to the rear of gearbox 3 is shown in dash lines the axis of the shaft 12 for driving the tail rotor 13.

As well-known per se, drive/reduction-gear train 2,3 is supported by a set of four tie-rods 6 (FIG. 1) hingedly connected to the upper end 9 of the housing enclosing said train, and at further hinge points 16, 26 to the helicopter structure 1. It is a teaching of this invention that the torque reaction resulting from drive/reduction-gear train 2,3 is absorbed by the system 7 as seen in FIG. 2 comprising a flexible beam 8 extending transversely to the direction of rotor shaft 4 and perpendicularly to the symmetry plane 17 of the aircraft. As seen further is FIG. 3, the beam 8 also participates in suspending the train 2, 3 and has its middle part rigidly fixed by two bolts 18, 19 to the lower part of the housing of gearbox 3, and its ends 20 are resiliently attached to aircraft structure 1 through the agency of flexible blocks 10 reacting against attachment fittings 11. The points of attachment of the beam ends 20 lie on either side of symmetry plane 17, between the hinge points 16, 26 of tie-rods 6 and preferably closer to the rear hinge points 26 than to the forward hinge points 16 (FIG. 2). It is to be understood, however, that the beam could alternatively be positioned further forward and closer to the front hinge points 16 and be fixed at any convenient alternative point on the housing of drive/reduction-gear train 2, 3.

In a preferred embodiment of beam 8, the cross-section of the latter is either square or rectangular at the place of attachment to the drive/reduction-gear train housing in order to enable the securing bolts 18, 19 to absorb under satisfactory conditions the forces F due mainly to the torque reaction M (more than two securing bolts can be provided if necessary). From this central point outwards, the cross-section of beam 8 changes in shape and area along each arm of the beam and up to the ends 20 thereof where it resumes a square or rectangular shape in order to match the flexible blocks 10 for connection to structure 1. For exemplary purposes, the cross-section of beam 8 may evolve towards a substantially circular from which gradually blends into the square or rectangular shapes of the middle and terminal beam portions, and the area of said cross-section may either go steadily decreasing along each of the two beam arms or pass through a minimum value, as the case may be. So designed, the beam 8 is capable, depending on the shape adopted for it, not only of transmitting in-flight loads to the structure 1 buts also of participating together with its flexible attachment blocks 10 in filtering out certain vibration modes between the rotor and the structure, mainly in the transverse direction.

Beam 8 may be made either of metal or of a composite material based on synthetic resin and high-tensile carbon or boron fibres, or on a combination of metal and such composite material, whereby to provide satisfactory flexibility properties and low weight.

In the exemplary embodiment herein described and illustrated, the flexible blocks 10 for connecting the ends 20 of beam 8 to aircraft structure 1 are as seen in FIG. 5 deformable elements consisting of parallelepiped-shaped laminated blocks which bear against the flat faces of the ends 20 and which are connected to structure 1 by means of fittings 11 or any other convenient means for allowing said elements to shift within limits consistent with the desired longitudinal vibration damping.

These attachment blocks can be disposed at each end 20 of beam 8, either on each side of the beam (FIG. 3) or on one side of the beam at one end and on the other side of the beam at the other end (FIG. 4), either of these alternative arrangements being used depending on the magnitude of the balancing forces $F_1$.

The flexible attachment blocks 10 preferably consist of stacked slabs 14, 15 (FIG. 5), to wit of metal plates 14 alternating with flexible elements 15 made of a visco-elastic material which may be an elastomer based on polyurethane or silicone, the end elements being metal plates. These stacked elements are joined by mutual adhesion and jointly form a rectangular block.

An appropriate choice of the number of plates and slabs 14, 15 and of their respective thicknesses $e_1$, $e_2$, which may be different or equal, allows setting the degree of stiffness of the system, mainly in the longitudinal direction, and achieving a degree of transverse filtering through the agency of flexible slabs 15.

What I claim is:

1. A suspension system for an aircraft, having a frame, a rotary wing supported on a vertical shaft and a motor/transmission unit for said rotary wing, said motor/transmission unit having a motor and gear box aligned in the direction of said shaft and being linked by a set of guy rods to said frame, comprising a single elongated beam member arranged transversely to the direction of the shaft supporting the rotary wing, said beam being rigidly secured at a middle portion between the ends of said beam to one side of the casing of said motor/transmission unit and extending at each of its ends into vertical supporting engagment with the frame of said aircraft so that said beam is rotatable in a plane perpendicular to and conjointly with the shaft, and means for resiliently securing each of the ends of said beam member to said frame to dampen the torque created by movement of said beam in said perpendicular plane.

2. A system according to claim 1, in which the cross-section of the beam varies between said middle portion and said ends.

3. A system according to claim 2, in which the cross-section of the beam is rectangular at the ends thereof and at the middle portion thereof and changes between the middle portion and said ends to assume a shape which is substantially that of a circle of gradually varying diameter.

4. A system according to claim 1 wherein said elongated beam is made of material homogeneous along its entire length.

5. A system according to claim 4 in which the beam member is made of a composite material formed of synthetic resin and high-tensile fibres.

6. A system according to claim 4 in which the beam member is made of a combination of metal and a composite material based on synthetic resin and high-tensile fibres.

7. A system according to claim 1 wherein said guy rods extend from the frame of said aircraft to the apex of the casing of the motor/transmission unit and said elongated beam member is arranged between said guy rods.

8. A system according to claim 1 wherein the means for resiliently securing each of the ends of said beam comprise a resilient bearing block secured to said frame and respective ends of said beam and located within the plane of movement of said beam.

9. A system according to claim 8 in which the flexible blocks are disposed on at least one side of each end of the beam.

10. A system according to claim 8 wherein said bearing blocks comprise a laminate structure of elastic slabs alternately arranged between rigid sheets, said slabs and sheets being arranged in parallel planes to the plane of movement of said shaft.

11. A system according to claim 10, in which the beam member is made of metal.

12. A system according to claim 10, in which the flexible blocks are disposed at each end of the beam, respectively on one side and on the other side of said beam.

* * * * *